(No Model.)
D. LUMBERT.
TOOL HANDLE FASTENING.
No. 460,829. Patented Oct. 6, 1891.
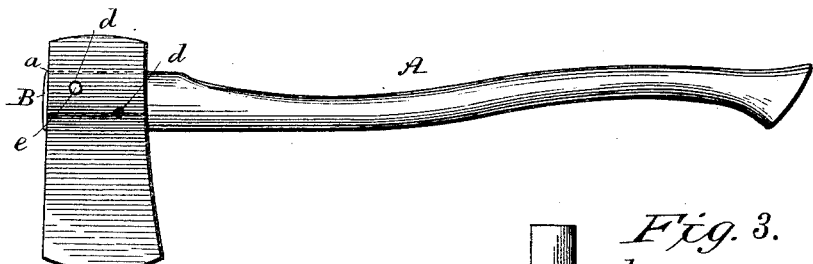
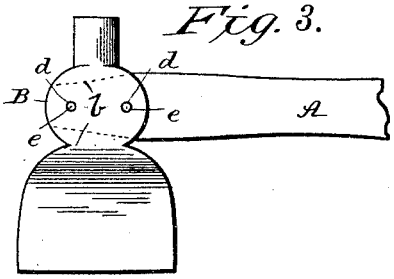
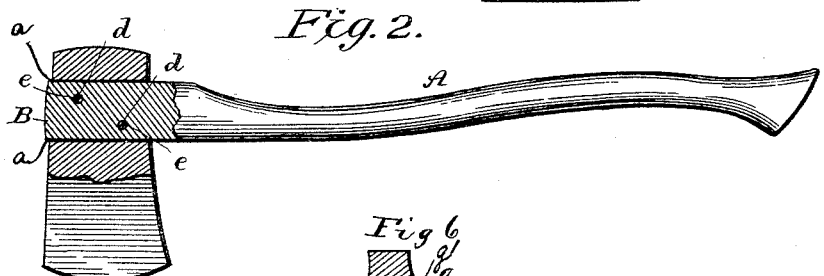
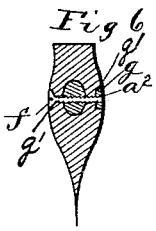
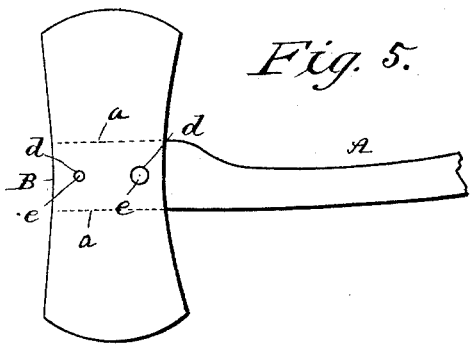
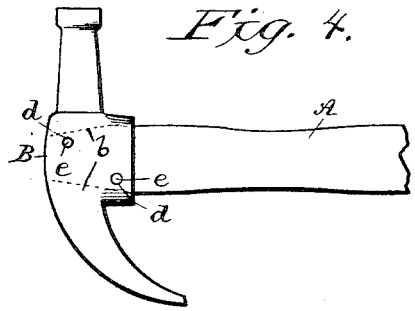
Witnesses
J. M. Fowler Jr.
Jonathan Alley.
Daniel Lumbert Inventor
By his Attorney in fact
Chas. E. Barber

United States Patent Office.

DANIEL LUMBERT, OF CENTREVILLE, MASSACHUSETTS.

TOOL-HANDLE FASTENING.

SPECIFICATION forming part of Letters Patent No. 460,829, dated October 6, 1891.

Application filed January 6, 1890. Serial No. 335,957. (No model.)

*To all whom it may concern:*

Be it known that I, DANIEL LUMBERT, a citizen of the United States, residing at Centreville, in the county of Barnstable, Cape Cod, and State of Massachusetts, have invented certain new and useful Improvements in Handle-Fastenings, of which the following is so full, clear, and exact a description as will enable others skilled in the art to which my invention appertains to make and use the same, reference being had to the accompanying drawings, in which—

Figure 1 is a side elevation of an ax provided with my improved fastening. Fig. 2 is the same view of the device shown in Fig. 1, with part of the ax and helve or handle broken away. Fig. 3 is a side elevation of a broad-ax. Fig. 4 is a side elevation of an inverted hammer provided with my fastening. Fig. 5 is a side elevation of a double-bladed reversible ax. Fig. 6 shows one form of pins to be used to hold the implement and handle together, and Fig. 7 shows another form for the same purpose.

The invention consists in the construction and arrangement of parts, as will be hereinafter described, and particularly pointed out in the claim.

In the accompanying drawings, A designates the handle of the implement, which may be made with straight parallel edges $a\ a$, as shown in Figs. 1, 2, and 5, or which may be provided with a beveled end, as shown at $b$ in Figs. 3 and 4. The handle A is adapted to be inserted into the perforation B in the implement. The perforation B is correspondingly beveled in Figs. 3 and 4 to receive the beveled end of the handles A A shown in those figures. Extending through the side walls of the perforation B in the implement are one or more transverse screw-threaded perforations $d\ d$. Said perforations are adapted to receive screw-threaded pins $e\ e$, which extend through the implement and handle, or said pins may be provided with a beveled head $f$ and a beveled screw-threaded nut $g$, as shown in Fig. 6.

It is also apparent that a very secure fastening may be obtained by screw-threading the perforations $d\ d$ internally and correspondingly screw-threading the pin throughout its entire length between the head and the opposite end and securing it firmly in place and then riveting the screw-threaded end, as shown in Fig. 7, or providing it with a beveled nut $g$, as shown in Fig. 6. Any number of pins may be used, according to the use to which the implement is to be put and its liability to work loose on the handle.

It is deemed important that there be at least two pins and that they be arranged at separated points, as shown, and not in line with each other in the direction of the length of the handle, as seen in Figs. 1, 2, and 4, so that they are better adapted to stand the strain when the tool is in use. The countersinks $g'$ receive the heads of the screws and the nuts and present a smooth surface upon the outside. The hold or grip of the screw and its tendency to draw the parts together is increased by its being threaded through both sides of the implement as well as the handle, and its tendency to loosen or come out is lessened.

Having described the objects, uses, and advantages of my invention and having set forth in detail various methods of carrying the same into practice, what I desire to secure by Letters Patent, and what I therefore claim, is—

An implement with an opening B, having transverse screw-threaded countersunk beveled perforations $d\ d$ at suitable intervals apart, a handle inserted in said opening, and pins $e\ e$, threaded entirely through the handle and implement, passing through the perforations and handle, and secured thereto, as shown and described.

In testimony whereof I affix my signature in the presence of two witnesses.

DANIEL LUMBERT.

Witnesses:
 GEO. H. HINCKLEY,
 EMMA L. LUMBERT.